June 13, 1961 F. WANKEL 2,988,008
ROTARY PISTON MACHINES
Filed Feb. 4, 1957

Inventor:
F. Wankel
By Glascock Downing Seebold
Attys.

United States Patent Office
2,988,008
Patented June 13, 1961

2,988,008
ROTARY PISTON MACHINES
Felix Wankel, Lindau (Bodensee), Germany, assignor to said Wankel and NSU Motorenwerke Aktiengesellschaft, a firm
Filed Feb. 4, 1957, Ser. No. 638,127
Claims priority, application Germany Feb. 7, 1956
6 Claims. (Cl. 103—121)

This invention relates to a rotary piston machine with two displacement bodies mounted with their axes parallel to one another, the facing surfaces of these bodies forming the walls of chambers of variable volume. Preferably, both the displacement bodies rotate although in accordance with the principle of kinematic reversal it is also possible for one of said bodies to be stationary. Where both bodies rotate, the machine is referred to as a rotary piston machine and the displacement bodies are called the inner and outer rotor respectively.

The rotors of the proposed rotating piston engine rotate in the same direction but at different angular velocities. In order to maintain a permanently effective sealing contact between the rotors during this movement, certain geometric forms have to be maintained. The shape more particularly of the outer rotor forms the subject of the present invention. The ratio between the speeds of rotation 2:3 or 3:4, the higher speed being that of the outer rotor. The outer rotor is in the form of an epitrochoid.

Rotary piston machines are already known in which trochoidal rotors are used. The new machine has substantial technical advantages, explained in detail hereinafter, over the known constructions. The known forms have either inner rotors in the form of an epitrochoid, or they have inner rotors in the form of a hypotrochoid. Outer rotors in the form of a hypotrochoid are also known, whereas epitrochoidal outer rotors have been proposed only for a speed ratio of 2:1.

The proposed machine with a speed ratio of 2:3 or 3:4 and an outer rotor in the form of an epitrochoid can be operated either as a pump or blower, as a compressor, or as an expansion engine. It offers special advantages if it is designed as an internal combustion engine in which a four-stroke cycle is carried out in three or four working chambers and in which in one form a prolonged expansion can be effected by simple means.

As compared with the known construction with an inner rotor in the form of a hypotrochoid, the advantage lies in the presence of three parallel contact edges fixed with respect to the inner rotor, which edges may for instance be provided with sealing strips and which divide volumes into three or four individual chambers of variable capacity.

Figure 1:
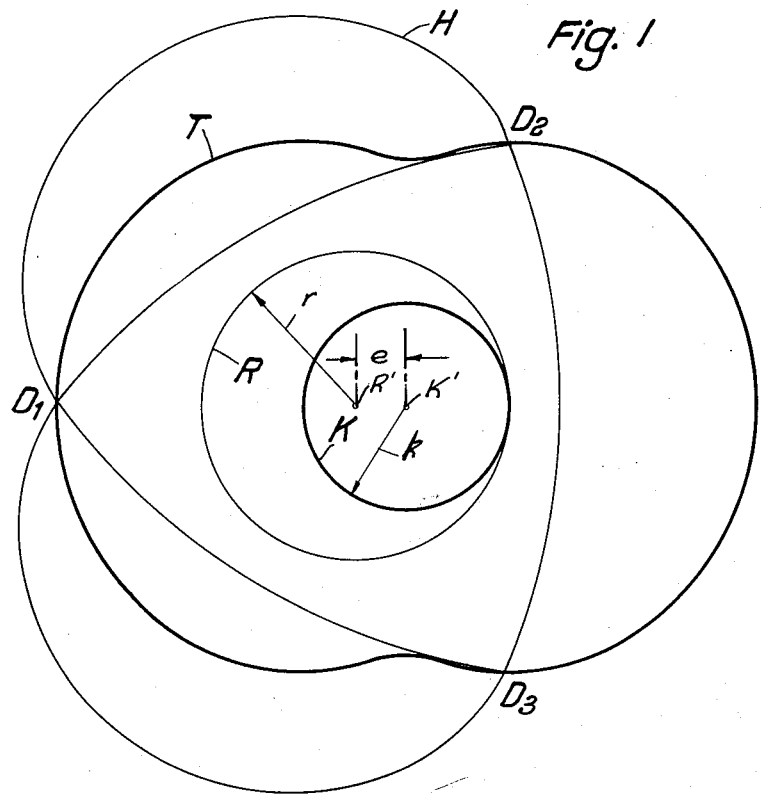
Figure 2:
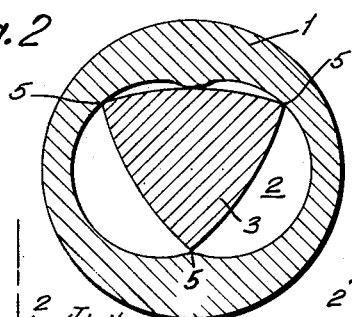
Figure 3:
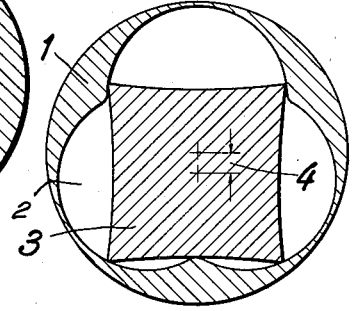
Figure 4:
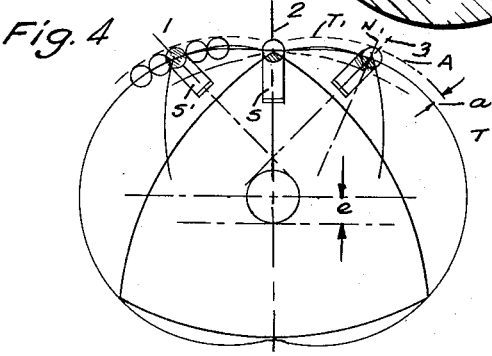

FIG. 1 shows diagrammatically an epitrochoidal outer rotor for a speed ratio of 2:3;
FIG. 2 is a diagrammatic sectional view of an epitrochoidal machine having a speed ratio of 2:3;
FIG. 3 is a similar view of a machine having a speed ratio of 3:4; and
FIG. 4 is a geometrical diagram illustrating the development of the curve of a modified outer rotor and also illustrating the relationship of sealing strips that extend axially of the rotors.

In FIGURE 1 a circle R of radius $r$ from center R' encloses a circle K of radius $k$ from center K', the centers R' and K' being spaced apart at distance $e$. Fixed with respect to circle R and movable therewith is a point $D_1$. Points $D_2$ and $D_3$ need not be considered for the moment. Now if circle R rolls on circle K in the clockwise direction, point $D_1$ will move upwardly along the epitrochoid curve T. Since circle R is rolling, without slipping on circle K, the distance between point $D_1$ and the center K' of circle K will vary from the maximum distance $D_1R'+e$ shown in FIGURE 1, to a minimum distance $D_2R'-e$ when $D_1$ is directly above the point K' in FIGURE 1. The curve T varies again to the maximum on the right hand end of FIGURE 1 and a minimum directly below point K'.

Point $D_2$ illustrates the position point $D_1$ will take when the generally triangular curve $D_1$, $D_2$, $D_3$ has moved to just beyond the first minimum from its position shown in the figure, and point $D_3$ illustrates the position $D_1$ will take when it has passed, from its original position through a minimum at the top of the figure, a maximum at the right hand end of the figure, then almost to the minimum at the lower side of the curve T in the figure. Each point $D_1$, $D_2$, $D_3$ describes the identical curve T. The specific curve developed in FIGURE 1 is the result of the two circles K and R having radii proportioned $k:r$ as 2:3. This gives rise to a machine having a section as seen in FIGURE 2. Where $k:r$ as 3:4 the same construction method is used and the result is a three-lobed outer curve and a four pointed instead of a three pointed inner curve, giving rise to a machine having a section as seen in FIGURE 3.

Now if the circle R in FIGURE 1 were held stationary and circle K, carrying curve T with it, were rolled about circle R, the curve that would envelop the curve T would be curve H. Curve T always contacts curve H at $D_1$, $D_2$ and $D_3$, the indentations in curve T never extend inwardly beyond the generally triangular portion $D_1$, $D_2$, $D_3$, which defines the inner envelope, and the lobes of curve T never extend outwardly beyond the lobes of curve H which define the outer envelope. It is clear that a specific shape for the triangular portion $D_1$, $D_2$, $D_3$ if made solid for use as a rotor operating in a hollow the shape of curve T will be limited by the theoretical shape of $D_1$, $D_2$, $D_3$ but may be made smaller, that is somewhat less bulging than the theoretical. The ratio of the maximum to the minimum magnitude of each of the areas between curve T and curve $D_1$, $D_2$, $D_3$, as the two curves rotate with respect to each other, will be greatest using the true envelope shape but it may be more suitable for practical machine design purposes if the curved sides of the triangular element $D_1$, $D_2$, $D_3$ are somewhat flattened.

Rotary piston machines in which the epitrochoid T cooperates with the outer envelope H of the epitrochoid are known. The epitrochoid as an outer rotor in combination with an inner rotor approximating to the inner envelope is the device in which the present invention is used. In FIGURES 2 and 3 the machines shown may be considered to have any desired dimension normal to the plane of the paper. The spaces 2 between the inner rotor 3 (inner envelope) and outer rotor 1 (epitrochoid), then define variable volumes that may be used as pump or compressor chambers. The length, that is, the dimension of such a machine in the direction normal to the paper, has, of course, no bearing on the compression ratio which, for a given epitrochoid, is determined solely by the selection of the specific approximation of the inner envelope curve.

FIGURES 2 and 3 of the accompanying drawings show constructions of the rotors for a speed ratio of 2:3 and 3:4 respectively. In each case, the contour of the epitrochoid, having a two- or three-arched course, can be seen at 1. The variable volumes are indicated at 2, while 3 denotes the form of the inner rotor approximating to the respective inner envelopes. In FIGURE 2 the inner rotor has three apex portions, the radially outermost points of which describe the epitrochoid, whereas in FIGURE 3 the inner rotor has four apex portions, the radially outermost points of which describe the epitrochoid. The axes of the inner and outer rotors are displaced from one another by the eccentricity shown at 4.

If the contour of the outer rotor were made exactly in the shape of the epitrochoid, the contact between the inner and outer rotors would be along a thin line at the corners of the inner rotors which would tend to dig into the outer rotor and in any case would present a very narrow wearing surface. If sealing strips are used at the corners it is desirable to allow the contact points to move over a part of the strip width or over the whole of the strip width, in order to reduce and distribute the wear. In this case the outer rotor has the form of an outer parallel curve lying at a short distance from the epitrochoid. Preferably, the distance of the parallel curve is equal to one half of the width of the radial sealing elements.

The expression parallel curve is intended to designate a curve which is spaced from the curve of the epitrochoid by a uniform distance measured along a line normal to each curve.

In FIG. 4, curve T designates a true epitrochoid, N denotes a line that is normal to both of curves T and $T_1$, thus the surface defined by curve $T_1$ is a curve that is parallel to curve T, and $a$ is the distance between the curves T and $T_1$ along any normal line N.

On utilizing the true epitrochoidal curve T for the contour of the outer rotor each sealing strip S, there being one along each corner of the inner rotor, has to possess a sharp edge for continuous contact with said curve T along a line. On high rotary speeds and corresponding high rate of slip there will occur a strong wear effect on said contact line.

However, on utilizing the outer parallel curve $T_1$ for the contour of the outer rotor the contact line of each sealing strip $S_1$ will not be always on the same spot but is able to move over a substantial portion of the width of the sealing strip as the inner rotor rotates with respect to the outer rotor. Thus the wear effect exerted on each sealing strip $S'_1$ will be substantially less than the wear exerted on each strip S as it is distributed over a substantial portion of the width of the sealing strip. If the distance $a$ between the curves T and $T_1$ is equal to one half of the width of the radial sealing elements the contact line is able to move over a substantial portion of the whole width of the sealing strip as can be seen from FIG. 4 on comparison of the position of the left-hand sealing strip $S_1$ with that one of the right-hand sealing strip (corners 1 and 3).

What I claim is:

1. A rotary mechanism for pumps, fluid motors, combustion engines or the like; said mechanism comprising an outer body having a cavity and an inner body received within said outer body cavity for relative rotation therein with the axis of the inner body being laterally spaced from but parallel to the axis of the outer body cavity, the inner surface of the peripheral wall of said outer body cavity having basically the profile of a multi-lobed epitrochoid with said lobes being equally spaced about said outer body axis, said inner body having an outer surface with a plurality of apex portions, one more in number than the number of said lobes, said apex portions being equally spaced about the axis of the inner body and being equidistant from the axis of the inner body, each of said apex portions having its radially outermost point disposed at said epitrochoidal surface in all relative rotative positions of said inner and outer bodies; and sealing strip means carried by the inner body at each of its apex portions for continuous sealing engagement with the epitrochoidal inner surface to form a plurality of working chambers between the external surface of the inner body and said epitrochoidal inner surface which chambers vary in volume upon relative rotation of said bodies about said axes, each said sealing strip means extending along the radially outermost point of its associated apex portion and being narrow so as to be circumferentially confined substantially to said point.

2. A rotary mechanism as recited in claim 1 in which the epitrochoid inner surface of said outer body has two lobes and the inner body has three apex portions such that the external surface of said inner body has a generally triangular configuration.

3. A rotary mechanism as recited in claim 1 in which the epitrochoid inner surface of said outer body has three lobes and the inner body has four apex portions such that the external surface of said inner body has a generally square configuration.

4. A rotary mechanism as recited in claim 1 in which the profile of said inner surface is defined by a curve that is parallel to and is spaced outwardly from a true epitrochoid a small distance no greater than the width of each said narrow sealing strip means.

5. A rotary mechanism as recited in claim 4 in which each said sealing strip means has a rounded outer edge for sealing engagement with the epitrochoidal inner surface of said cavity, and the radius of curvature of said rounded outer edge of each seal strip being at least equal to the distance between said inner surface and said true epitrochoid.

6. A rotary mechanism as recited in claim 5 in which said seal strip means is radially movable.

References Cited in the file of this patent

UNITED STATES PATENTS

| 724,994 | Cooley | Apr. 7, 1903 |
| 1,636,486 | Planche | July 19, 1927 |
| 2,091,317 | Hill | Aug. 31, 1937 |
| 2,790,394 | Mori | Apr. 30, 1957 |
| 2,866,417 | Nobling | Dec. 30, 1958 |

FOREIGN PATENTS

| 223,257 | Great Britain | Apr. 16, 1923 |
| 583,035 | Great Britain | Dec. 5, 1946 |
| 853,807 | France | Dec. 16, 1939 |
| 951,600 | Germany | Oct. 31, 1956 |
| 1,125,876 | France | July 16, 1956 |

OTHER REFERENCES

Kinematics of Gerotors, by Myron F. Hill, 1927. (Copy in 103–126A.)

Kinematics of Gerotors, Rotoids and Gears, by Myron F. Hill, 1947. (Copy in 103–126A.)